United States Patent [19]

Togino et al.

[11] Patent Number: 4,682,859

[45] Date of Patent: Jul. 28, 1987

[54] OBJECTIVE LENS FOR MICROSCOPE

[75] Inventors: Takayosi Togino, Tokyo; Yuko Kobayashi; Ken Yonekubo, both of Hachioji, all of Japan

[73] Assignee: Olympus Optical Co., Ltd., Japan

[21] Appl. No.: 707,603

[22] Filed: Mar. 4, 1985

[30] Foreign Application Priority Data

Jul. 5, 1984 [JP] Japan .................... 59-100683[U]

[51] Int. Cl.[4] .............................................. G02B 2/02
[52] U.S. Cl. ................................................ 350/414
[58] Field of Search ........................................ 350/414

[56] References Cited

U.S. PATENT DOCUMENTS 2,764,061  9/1956  Kinder et al. ................. 350/414
4,208,101  6/1980  Trapp et al. ................... 350/414

FOREIGN PATENT DOCUMENTS 56-142508  11/1981  Japan .

*Primary Examiner*—John K. Corbin
*Assistant Examiner*—Rebecca D. Gass
*Attorney, Agent, or Firm*—Ostrolenk, Faber, Gerb & Soffen

[57] ABSTRACT

An objective lens for a microscope includes a plane parallel plate detachably mounted on a lens barrel so as to be interposed between an object being observed and a front lens as a result of this arrangement, correction is made for a change in aberrations which results from a variation in the thickness of a cover glass.

11 Claims, 3 Drawing Figures

OBJECTIVE LENS FOR MICROSCOPE

BACKGROUND OF THE INVENTION

The invention relates to an objective lens for a microscope and, in particular, to such an objective lens which maintains a good correction of aberrations due to large variations in the thickness of cover glasses.

An objective lens for a microscope is generally designed to achieve a good correction of aberrations when a cover glass having an optical path length $d_0$ is used. However, cover glasses are not always manufactured to a given thickness, and, in the past, this has prevented a viewer from performing a microscopic examination with a cover glass having a different optical path length $d_0$ from observing a sharp image when an objective lens is used which is well-designed to achieve a good correction of aberrations for a cover glass of optical path length $d_0$.

For microscope objective lenses having numerical apertures (hereafter abbreviated as NA) which are equal to or greater than 0.3 to 0.4, changes occurring in the aberrations which result from a variation in the thickness of a cover glass interposed between a front lens and an object being observed can no longer be neglected. In particular, for NA values which approach 0.6, changes in the aberrations increase in an accelerated manner with an increase in the numerical value, thus distorting the image of the object to be viewed. This can be clearly appreciated from FIG. 3 which graphically indicates the behaviour of the spherical aberration for so-called d-line of NA 0.5 objective lens with and without 1 mm thick cover glass, the lens being corrected for aberrations when a 1 mm thick cover glass is used.

Japanese Laid-Open Patent Application No. 142,508/1981 proposes a technique in which a suitable lens spacing is chosen and telescoped by a cam which is mechanically coupled with a correcting ring to provide correction against changes in the aberrations which result from the varying thicknesses of cover glasses. However, with this proposed technique, a good correction of aberrations is precluded for a large variation in the thickness of the cover glass or for increased numerical aperture values. Thus a limited range of available correction results, and the aberrations are appreciably exacerbated towards the limits of the range. In addition, the technique allows a change in the spherical aberration to be corrected, but fails to correct for a change in the chromatic aberration. As a consequence, with an apochromatic objective lens which has its chromatic aberration corrected down to so-called g-line, the correction of aberration is possible with a variation in the thickness of the cover glass only up to the order of 0.2 mm.

SUMMARY OF THE INVENTION

It is an object of the invention to provide an objective lens for a microscope which enables a good correction for a change in aberrations resulting from a variation in the thickness of a cover glass, in particular when the objective lens has a high value of numerical aperture, and when a cover glass is not used.

In accordance with the invention, a transparent plane parallel plate is interposed between a front lens of the objective lens and an object to be observed for the purpose of correcting aberrations. This avoids the need to interchange an objective lens when cover glasses of different thicknesses are used. It is only necessary that the plane parallel plate disposed at the front end of the objective lens be replaced by one having a thickness which corresponds to the thickness of a cover glass to be used in order to assure that an image can be viewed for which aberrations are properly corrected. This dispenses with the provision of a plurality of objective lenses which are differently designed to accommodate cover glasses of varying thicknesses, and also eliminates the need for a correction mechanism which would otherwise be required to shift a group of lens elements for correcting aberrations. Thus, the invention provides a simple arrangement of reduced cost.

DETAILED DESCRIPTION OF THE PREFERRED EMBODIMENTS

Figure 1:
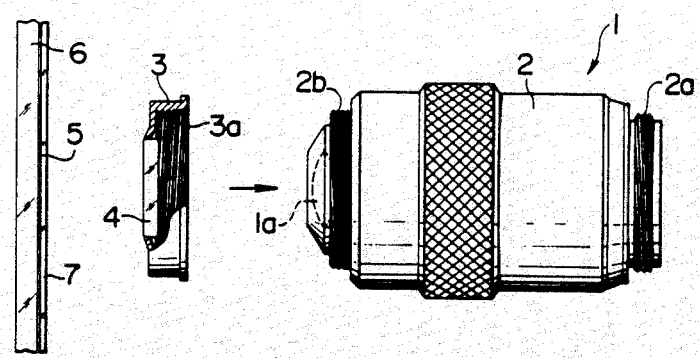
FIG. 1 is a side elevation of an objective lens for a microscope according to one embodiment of the invention.

Referring to FIG. 1, an object 5 to be observed is placed on top of a slide glass 6 and covered by a cover glass 7. An objective lens 1 for a microscope comprises a lens barrel 2 and a group of lens elements, not shown, which are contained within the barrel 2 and which include a front lens 1a. The barrel includes a mount 2a which is adapted to mate with a revolver, not shown, and a threaded portion 2b which is formed around a peripheral surface located toward the object. A mounting frame 3 has an internally threaded portion 3a which is threadably engageable with the threaded portion 2b of the barrel 2, and carries a transparent plane parallel plate 4 which may be formed of glass, for example. If may be assumed that the objective lens is designed to achieve a good correction of aberrations for a cover glass having a refractive index $n_0$ and a thickness $D_0$ or an optical path length of $d_0 = D_0/n_0$. The thickness D of the plate 4 is determined so that its optical path length d, given by $d = D/n$ where n represents the refractive index of the plate, is equal to $d_0 - d'$ where $d' = D'/n'$ and D' represents the thickness and n' the refractive index of a cover glass to be used.

In use, when employing a cover glass having the optical path length $d_0$, the objective lens 1 alone may be used for observation without fitting the frame 3 on the lens barrel 2. Since the lens 1 is originally designed to provide optimum correction for this cover glass, an image can be viewed for which aberrations are well corrected. When employing a cover glass having the optical path length d', a frame 3 carrying a plane parallel plate 4 having the optical path length d which is determined by the equation $d = d_0 - d'$ may be fitted on the lens barrel 2. A combination of the cover glass having the optical path length d' and the plate 4 having the path length d which is interposed between the object 5 and the front lens 1a is equivalent to a cover glass having the optical path length $d_0 = (d' + d)$ inserted therebetween. Thus an image can be viewed for which aberrations are well corrected.

When the object 5 is to be viewed without any cover glass, an image for which aberrations are well corrected can be viewed again, by fitting on the lens barrel 2 a frame 3 carrying a plane parallel plate having an optical path length $d_0$ or a thickness $D_1$ given by $D_1 = d_0 \cdot n_1$ where $n_1$ represents the refractive index of a material chosen for the plate, which may comprise transparent plastic material such as acrylic material. This simplifies the fabrication of the plane parallel plate and also prevents its cracking upon impact against the object being observed.

Figure 2:
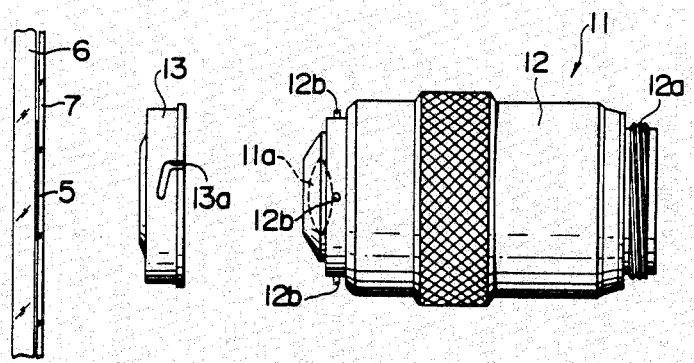
FIG. 2 is a side elevation of an objective lens according to another embodiment of the invention.
Figure 3:
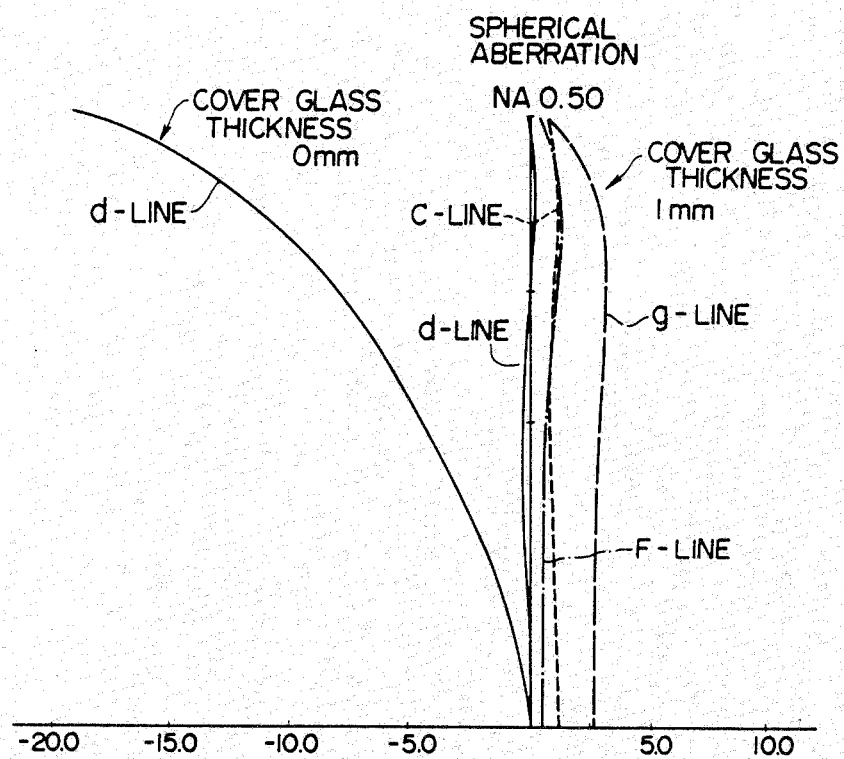
FIG. 3 graphically shows aberration curves indicating the spherical aberrations to so-called d, C, F and g-lines of a conventional objective lens for a microscope with a cover glass of a designed thickness and the spherical aberration to a d-line of the lens without the cover glass.

FIG. 2 shows an objective lens 11 according to another embodiment of the invention. The objective lens includes a front lens 11a contained within a lens barrel 12, the peripheral surface of which is provided with a plurality of projections 12b in the form of pins, toward the object. A mounting frame 13 carries a plane parallel plate, not shown, and is formed with a plurality of notches 13a which are engageable with the projections 12b by a bayonet coupling. The arrangement functions in the same manner as described above in connection with FIG. 1.

It will be appreciated that where a fluorescent microscope of transmission type is used, the incidence of fluorescence into the objective lens is prevented by a ultraviolet rejection filter or barrier filter which is mounted on the front end of the objective lens. By choosing a barrier filter having an optical path length $d_0$, the dual purpose of correcting for aberrations which result from a varying thickness of a cover glass and of preventing a reduction in the contrast caused by fluorescence within the objective lens can be served by a single member.

What is claimed is:

1. A microscope lens system for viewing an object which may be covered by a transparent cover glass, comprising:
   a lens barrel having an objective lens therein;
   at least one transparent planar parallel plate having a predetermined optical path length;
   said objective lens being designed for the combined optical path lengths of a respective one of said at least one parallel plate and any cover glass placed upon the object viewed by the lens system; and
   mounting means for detachably mounting said respective parallel plate on said lens barrel, whereby said respective parallel plate may be conveniently replaced by another respective parallel plate of different optical path length than said predetermined optical path length to prevent an aberration in image in the objective lens which would result from the use of a cover glass on the object being viewed of different thickness than said cover glass used with said first-mentioned parallel plate.

2. A lens system according to claim 1 in which the first-mentioned parallel plate has an optical path length d defined by the equation $d = d_0 - d'$ where $d_0$ represents the optical path length of a particular cover glass for which the objective lens is designed and $d'$ represents the optical path length of a respective cover glass to be used in conjunction with a respective parallel plate.

3. A lens system according to claim 1 in which said mounting means comprise a threadable lens barrel.

4. A lens system according to claim 1 in which said mounting means comprise a bayonet coupling.

5. A lens system according to claim 1 in which said respective parallel plate also constitutes a barrier filter of a fluorescent microscope.

6. A lens system according to claim 1 in which the first planar parallel plate comprises glass or transparent plastic material.

7. A lens system according to claim 1 in which said objective lens comprise a compound lens.

8. A lens system according to claim 1 in which said mounting means is effective for mounting said respective parallel plate between said objective lens and any object being viewed.

9. A microscope lens system for viewing of an object, comprising:
   a lens barrel having an objective lens therein, said objective lens being designed for use with a cover glass of a first optical path length;
   a cover glass for covering an object to be viewed by the lens system and having a second optical path length different from said first optical path length;
   a transparent planar parallel plate detachably mounted to said lens barrel and having a third optical path length; and
   said second and third optical path lengths cumulating to equal said first optical path length.

10. A microscope lens system for viewing of an object which may be covered by a transparent cover glass, said lens system comprising:
    a lens barrel having an objective lens therein;
    a plurality of transparent planar parallel plates;
    mounting means for detachably mounting said plurality of planar plates, one at a time, to said lens barrel; and
    each of said plurality of plates having an optical path length different from the optical path lengths of the other plates, whereby each plate is adapted to be used with a respective cover glass of unique optical path length.

11. The lens system of claim 10 wherein each of said planar plates and said respective cover glass to be used with said plate have a combined optical path length equalling the optical path length of a particular cover glass to which said objective lens is designed where no transparent planar parallel plates other than said particular cover glass is used in combination with said particular cover glass.

* * * * *